United States Patent [19]

Rogers et al.

[11] Patent Number: 5,025,119

[45] Date of Patent: Jun. 18, 1991

[54] ONE-TIME-CLOSE RELAY USEFUL IN SPACECRAFT POWER SYSTEMS

[75] Inventors: Howard H. Rogers, Torrance; Jerry J. Herrin, Santa Ana, both of Calif.

[73] Assignee: Hughes Aircraft Company, Los Angeles, Calif.

[21] Appl. No.: 513,460

[22] Filed: Apr. 23, 1990

[51] Int. Cl.$^5$ ............................................. H01H 1/02
[52] U.S. Cl. ...................................... 200/262; 335/83; 335/196
[58] Field of Search ................................... 335/78–85, 335/196–198; 200/262, 237, 238, 267; 307/361; 361/137

[56] References Cited

U.S. PATENT DOCUMENTS 3,859,491  1/1975  Larson ............................. 200/266
4,376,926  3/1983  Senor ............................... 377/104

Primary Examiner—Leo P. Picard
Assistant Examiner—Lincoln Donovan
Attorney, Agent, or Firm—Robert A. Westerlund; Steven M. Mitchell; Wanda K. Denson-Low

[57] ABSTRACT

A relay (30) has one or both current carrying relay contacts (12, 14) made of a soft, deformable, readily fusible metal, preferably indium, lead, cadmium, bismuth, or tin. When the relay (30) closes, the contacts (12, 14) deform or fuse together, ensuring good electrical conductance and eliminating chatter and accidental opening. The relay (30) is particularly useful in a bypass circuit (54) for a spacecraft battery system (50).

8 Claims, 1 Drawing Sheet

ONE-TIME-CLOSE RELAY USEFUL IN SPACECRAFT POWER SYSTEMS

BACKGROUND OF THE INVENTION

This invention relates to electrical relays, and, more particularly, to a relay that is first open, and then closes permanently upon command.

A relay is an electrical device that responds to particular input conditions and then opens or closes electrical contacts to make or break an electrical circuit through the contacts. In a typical relay, a small input signal such as a small voltage change controls one or more pairs of contacts designed to carry large electrical currents. Relays are widely used in a variety of electrical applications.

In one application, a relay is used in the bypass circuit of a spacecraft energy storage system. In such an energy storage system, a number of storage cells are interconnected together to store energy at preselected voltage and energy levels. A bypass circuit is provided to isolate storage cells that have failed, so that the failure does not cause an open circuit in the system.

The bypass circuit around each storage cell includes a relay that is normally open as long as the storage cell is operating properly. If a high voltage malfunction is detected in the storage cell, the relay operates and closes, to complete the bypass around the failed storage cell. The failed storage cell is thereby isolated from the remainder of the energy storage system, and the failure of one cell does not cause failure of the system, only a reduction in the overall energy storage capacity of the system. Spacecraft energy storage systems can be designed with an excess initial storage capacity to account for expected failures during operation.

Various types of relays have been tried in such bypass circuits. All have been found subject to relay chatter, where the current and voltage carrying contacts can spring open slightly under some conditions and cause arcing. Even conventional "latching" relays may open unintentionally in some conditions. The failed cell is thereafter no longer bypassed, and can damage other parts of the energy storage system or cause a malfunction in the power system.

There is therefore a need for an improved relay for use in the bypass circuit of a spacecraft energy storage system. The relay should be of the type that is normally open, can be closed upon command, and thereafter will remain securely closed. Such a relay should be highly reliable, and not subject to accidental opening or relay chatter. The present invention fulfills this need, and further provides related advantages.

SUMMARY OF THE INVENTION

The present invention is embodied in a one-time-close relay that is normally open, closes upon command, and thereafter remains closed not subject to relay chatter or accidental opening. The relay is reliable, and produces an excellent low resistance circuit through the relay contacts. The relay of the invention is smaller and lighter than conventional relays that can be used in this application.

In accordance with the invention, a one-time-close relay comprises a first relay contact made of a metal; a second relay contact disposed so that the second relay contact touches the first relay contact upon closing of the relay, the second relay contact being made of a deformable metal selected from the group consisting of indium, lead, cadmium, bismuth, and tin; and means for operating the relay to cause the first and second relay contacts to touch together, thereby forming an electrical circuit through the contacts.

In the preferred application, a spacecraft electrical power system comprises at least two electrical power storage cells electrically connected together to permit the storage of electrical energy; a bypass circuit around at least one of the storage cells; and a one-time-close relay in the bypass circuit, the relay being normally open when the storage cell is in use and closed when the storage cell is to be permanently bypassed, the relay including a first relay contact made of a metal; a second relay contact disposed so that the second relay contact touches the first relay contact upon operation of the relay, the second relay contact being made of a deformable metal selected from the group consisting of indium, lead, cadmium, bismuth, and tin, and means for operating the relay to cause the first and second relay contacts to touch together, thereby forming an electrical circuit through the contacts.

The electrical relay preferably utilizes contacts that are mounted on contact arms, which in turn are normally in an open position but then operated to close by any acceptable structure. One or both of the contacts are made of a soft, readily deformable and fusible metal. The contacts utilizing the soft metal can be made entirely of that metal. Alternatively, the soft metal can be plated or otherwise coated onto an underlying harder metal, so that the soft metal forms the contact surface.

When the relay is in the open position, the material of construction of the contacts is unimportant. However, when the relay is closed, the contacts of the soft metal deform together in a conformable manner, or may even weld together, to form a permanently closed electrical current path that cannot chatter or be opened accidentally.

The maintenance of the closed contacts does not depend upon any external signal, spring, or other structure. Instead, the relay contacts cannot be physically parted except by some extraordinary effort. Thus, the one-time-close relay of the invention achieves and maintains a closed state upon command with complete reliability. No complex structure to lock the contacts together is required. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

In accordance with the invention, a one-time-close relay constructed to carry an electrical current comprises a first relay contact and a second relay contact, at least one of the relay contacts being made of a deformable metal that permanently bonds to the other relay contact when the relay is operated; and means for operating the relay to cause the first and second relay contacts to touch together, thereby forming an electrical circuit through the contacts.

An embodiment of the invention wherein only one of the relay contacts is made of such a deformable metal is operable, but it is preferable to make both of the contacts of the deformable metal. In the later form, a one-time-close relay comprises a first relay contact made of a deformable metal selected from the group consisting of indium, lead, cadmium, bismuth, and tin; a second relay contact disposed so that the second relay contact touches the first relay contact upon operation of the relay, the second relay contact being made of a deformable metal selected from the group consisting of indium, lead, cadmium, bismuth, and tin; and means for operating the relay to cause the first and second relay contacts to touch together, thereby forming an electrical circuit through the contacts.

Figure 1:
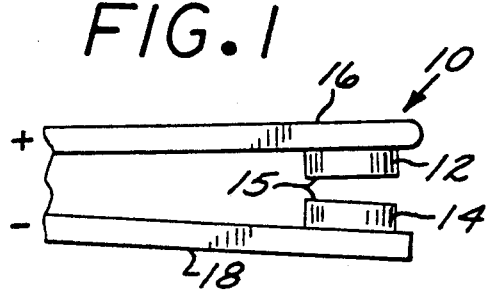
FIG. 1 is a side elevational view of relay contacts prior to closure.
Figure 2:
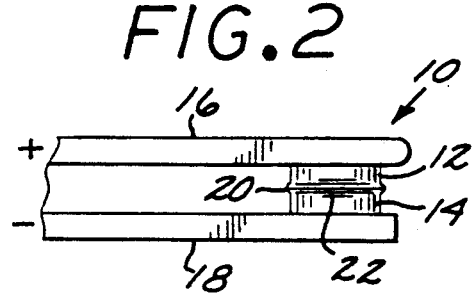
FIG. 2 is a side elevational view like that of FIG. 1, except where the contacts are closed and deformed together.
Figure 3:
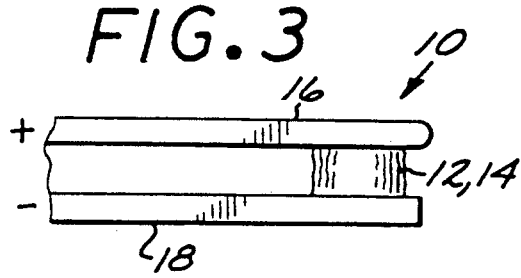
FIG. 3 is a side elevational view like that of FIG. 1, except where the contacts are closed and fused together.
Figure 4:
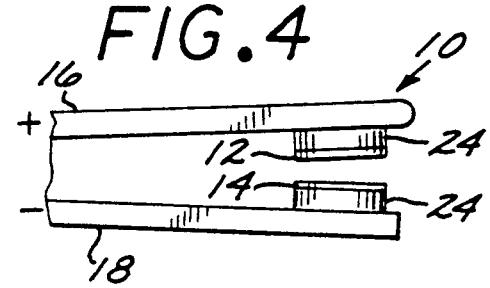
FIG. 4 is a side elevational view like that of FIG. 1, but of another embodiment of the contact structure.

A set 10 of relay contacts incorporating the invention is illustrated in a first embodiment in FIGS. 1-3, and in another embodiment in FIG. 4. Referring to FIG. 1, two contacts 12 and 14 are supported on respective contact support arms 16 and 18, with the contacts 12 and 14 in a generally facing relationship. Facing surfaces 15 are termed the contact surfaces, because it is at these surfaces that touching contact between the contacts 12 and 14 occurs when the relay closes. The contact support arms 16 and 18 are made of an electrically conducting material such as copper.

At least one of the contacts 12 and 14, and preferably both, are made of a metal that is readily deformable and has a low melting point (that is, is readily fusible). It is preferred that both contacts be made of the same metal, to promote welding of the two metals together and to avoid alloying effects that reduce conductivity. Most preferably, the metal of the contacts is a pure, soft metal with good electrical conductivity, having less than about 0.1 percent total impurities.

Acceptable metals that have been identified for use as the contact materials are indium (melting point 157° C.), lead (326° C.), cadmium (321° C.), bismuth (271° C.), and tin (232° C.). Tin is less preferred than the others in this group, because it can be subject to a spontaneous long term degradation termed "tin disease". The naming of each of these deformable contact materials includes those of its alloys having a sufficiently low electrical resistance that the voltage drop across the contacts is acceptably low.

This construction of the contacts 12 and 14 is to be contrasted with the prior approach. In most relays, the contacts are made of a hard metal that can resist wear during multiple closings and openings of the contacts, and which has an acceptably low electrically conductivity. Lightly alloyed copper is normally used. Moreover, the contacts are designed to avoid any bonding between the contacts of the type illustrated in FIG. 2 or melting of the type illustrated in FIG. 3.

In FIG. 1 the relay and the contacts 12 and 14 are open, and no current flows through the contacts 12 and 14. In FIG. 2, the contacts 12 and 14 have been brought into a touching contact with each other, so that a current flows through the contact arm 16, the contact 12, the contact 14, and the contact arm 18. The contacts have deformed slightly and bonded together by a combination of cold and warm welding as a result of being forced together, as indicated by the bulging of the contacts, numeral 20 and a bond line 22. (FIG. 2 illustrates bonding along the entire bond line 22, but bonding along a portion of the length is usually sufficient.)

In FIG. 3, the electrical current passing through the contacts 12 and 14 has caused local melting of the contacts in the region of the surface of contact. The bond line 22 has disappeared, and as a result the electrical resistance of the conducting path through the contacts 12 and 14 has been reduced. The melted region cools, with the result that there is a metallurgical bond between the contacts 12 and 14. The contact area of the contacts 12 and 14 can be selected based upon a knowledge of the current to be carried through the contacts. That area is just sufficient to cause the bond line to melt and then cool and solidify after melting, when the electrical resistance at the contact surface has reduced so that the metal is no longer maintained above its melting point.

Either of the structures illustrated in FIG. 2 and FIG. 3 is acceptable in the operation of the invention. The structure depicted in FIG. 3 is often the final result in a progression from the open contacts of FIG. 1, closed and bonded contacts of FIG. 2, and finally the locally melted and cooled structure of FIG. 3 if the current through the contacts is sufficiently high. The melted structure of FIG. 3 is, however, not required for the one-time-close relay of the invention to operate properly. In either the structure of FIG. 2 or the structure of FIG. 3, the contacts 12 and 14 are permanently bonded together. They cannot accidentally open, nor can they chatter when vibrated. The fused structure of FIG. 3 is preferred over that of the mechanical bond of FIG. 2, because the melting and subsequent solidification results in reduced total resistance for an electrical current flowing through the contacts. A reduced voltage drop through the relay is desirable in a spacecraft power system.

This locking action of the relay and contacts in the closed position occurs because of mechanical (FIG. 2) or metallurgical (FIG. 3) bonding of the contacts, not because of any mechanical or electrical latch that can be accidentally opened. Separate mechanical and electrical latching components such as may be found in prior relays can therefore be eliminated in the relay of the invention, saving weight. Because there may be a number of such relays in a spacecraft energy storage system, and because the cost of lifting weight to orbit is high, such savings are important in designing spacecraft of maximum effectiveness and efficiency.

FIG. 4 illustrates another embodiment, wherein each of the contacts 12 and 14 is in the form of a relatively thin layer supported on a conducting base 24. The thin layer contacts 12 and 14 can be formed on the base 24 by any conventional technique, such as coating or plating. The contacts 12 and 14 are formed of the materials previously discussed, and function in the same manner as previously discussed. The base 24 is normally made of copper.

Figure 5:
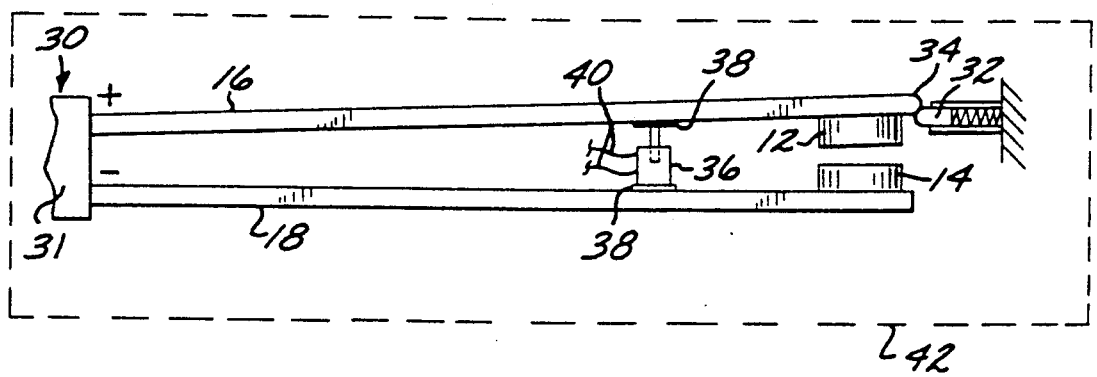
FIG. 5 is a diagrammatic view of a relay in accordance with the present invention.

FIG. 5 illustrates a complete relay 30, utilizing the contacts 12 and 14, and contact arms 16 and 18, as previously described. Also included is a means for operating the relay to cause the relay contacts 12 and 14 to touch together in the manner illustrated in FIGS. 2 and 3. The support arms 16 and 18 are mounted on a base 31. The means further includes a spring-loaded overcenter cam 32, made of an electrically nonconducting material, mounted adjacent an end 34 of one of the contact arms, here the arm 16. The rounded end 34 of the contact arm 16 rides against the surface of the cam 32. The end 34 is normally held in an open position so that the contacts 12 and 14 cannot touch, but can be moved over the cam to the other stable position with the contacts 12 and 14 touching, upon operation of the electromechanical structure discussed next. The overcenter design of the relay forces the contacts 12 and 14 together, and holds them together for a sufficient time that mechanical bonding or welding can occur.

An electromagnetic coil 36 is mounted between the contact arms 16 and 18, using insulating spacers 38. The coil 36 pulls the contact arms 16 and 18 together so that the contacts 12 and 14 come into touching contact, under appropriate conditions. The body of the coil 36 is attached to one of the contact arms (through the spacer), while the core of the coil 36 is mounted to the other of the contact arms (through the spacer). When a voltage is applied to leads 40 of the coil, the core is forced into the body of the coil and the contacts 12 and 14 are drawn together in cooperation with the overcenter mechanism. Preferably, the relay 40 is enclosed in a gas-tight enclosure 42, filled with an inert gas such as argon, to prevent oxidation or corrosion of the components of the relay.

Figure 6:
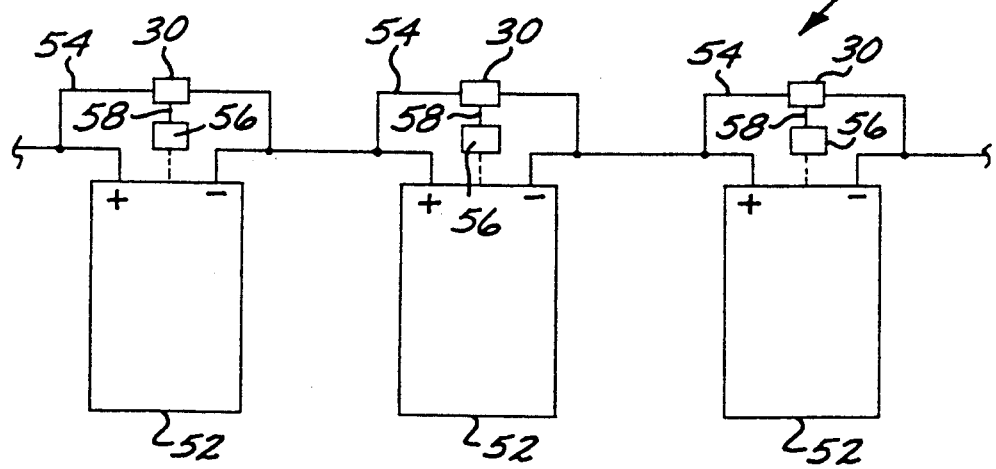
FIG. 6 is a diagrammatic view of a spacecraft energy storage system having a bypass circuit system that uses the relay of the invention.

A spacecraft power storage system 50 is depicted in FIG. 6, illustrating a typical and preferred use of the relay of the present invention. Three electrical storage cells 52 are connected in series, as illustrated. A separate bypass circuit 54 is shown for each of the cells 52.

For each of the bypass circuits 54, the bypass circuit is connected around the cell 52. The bypass circuit 54 includes a relay, such as the preferred relay 30. When the relay is open, its normal condition, electrical current flows through the cell 52.

A sensor 56 monitors the status of the cell 52, and transmits a voltage signal through sensor leads 58 to the leads 40 of the relay 30 when a malfunction condition is detected. In FIG. 6, the sensor 56 is indicated in dashed line relation to the cell 52, because the sensor 56 may sense any of a number of conditions of the cell. In one case, the potential malfunction is an overvoltage condition, wherein the voltage of the cell increases above its design value. The sensor 56 may be as simple as several diodes in series that conduct a current when a preselected voltage is exceeded. The diodes prevent the relay from being a drain on the cell at the normal operating voltage of about 1-1.6 volts. For example, the relay 30 might be activated by a circuit having three diodes in series with the relay across the cell terminals, which would pull in the relay at a specific voltage, e.g., 1.0 volt. In that case, the relay activates when the voltage across the cell terminals exceeds about $\frac{2}{3}$ volt per diode plus the specific voltage, or in this example about 3 volts. Alternatively, the sensor may sense another condition, such as structural integrity of the cell 52 or the pressure within the cell.

If a malfunction condition is determined by the sensor 56 for the cell 52, a small voltage is applied across the relay leads 40. The coil 36 is activated, drawing the contacts 12 and 14 together. The pressure on the contacts due to the overcenter cam 32 causes the material of the contacts 12 and 14 to deform and mechanically bond, the result being as illustrated in FIG. 2.

As the contacts 12 and 14 complete the bypass circuit, the cell 52 whose relay 30 has operated is isolated from the system 50, so that current no longer flows through the cell 52. The current flows instead through the bypass circuit 54 and thence through the contacts 12 and 14. As discussed in relation to FIG. 3, this current heats the contacts, increasing the mechanical deformation as long as the contacts 12 and 14 are below their melting points. If, instead, the contacts are heated above their melting points, particularly in the region of the bond line 22, the contacts locally melt and fuse together in a metallurgical bond. As discussed previously, either a mechanical or a metallurgical bond between the contacts ensures that the contacts 12 and 14 cannot come apart inadvertently or chatter.

The closing of the relay occurs only one time. Once a particular cell 52 has been analyzed as malfunctioning, it is not brought back on line at a later time, even if it appears to resume normal operation as determined by the sensors.

The present relay provides a reliable approach for achieving a one-time-close relay contact, which is normally open but closes once, as in the event of an indicated malfunction of an element that is to be removed from service. Although particular embodiments of the invention have been described in detail for purposes of illustration, various modifications may be made without departing from the spirit and scope of the invention. Accordingly, the invention is not to be limited except as by the appended claims.

What is claimed is:

1. A one-time-close relay, comprising:
   a first relay contact;
   a second relay contact;
   means responsive to an electrical control signal for urging said second relay contact into engagement with said first relay contact, to thereby close said relay and form an electrical circuit through said first and second relay contacts; and,
   wherein at least respective contact surfaces of said first and second relay contacts are made of conductive materials which form a metallurgical bond upon closing of said relay, whereby said relay is rendered permanently closed and insusceptible of being opened under the influence of electrical energy.

2. The relay as set forth in claim 1, wherein at least a contact surface of at least one of said first and second relay contacts is made of a soft, readily deformable, and fusible metal.

3. The relay as set forth in claim 1, wherein at least a contact surface of at least one of said first and second relay contacts is made of a metal selected from the group consisting of indium, lead, cadmium, bismuth, and tin.

4. The relay as set forth in claim 1, wherein said metallurgical bond is formed by a melting and welding together of said conductive materials.

5. A spacecraft electrical power system, comprising:
   at least two electrical power storage cells electrically connected together to permit the storage of electrical energy;
   a bypass circuit around at least one of said storage cells; and,
   a one-time-close relay in said bypass circuit, said relay being normally open when the bypassed storage cell is in use and closed when the storage cell is to be bypassed, said relay including:

a first relay contact;

a second relay contact;

means responsive to an electrical control signal for urging said second relay contact into engagement with said first relay contact, to thereby close said relay and form an electrical circuit through said first and second relay contacts; and, wherein at least respective contact surfaces of said first and second relay contacts are made of conductive materials which form a metallurgical bond upon closing of said relay, whereby said relay is rendered permanently closed and insusceptible of being opened under the influence of electrical energy.

6. The power system as set forth in claim 5, wherein at least a contact surface of at least one of said first and second relay contacts is made of a soft, readily deformable, and fusible metal.

7. The power system as set forth in claim 5, wherein at least a contact surface of at least one of said first and second relay contacts is made of a metal selected from the group consisting of indium, lead, cadmium, bismuth, and tin.

8. The power system as set forth in claim 5, wherein said metallurgical bond is formed by a melting and welding together of said conductive materials.

* * * * *